(12) United States Patent
Tontinuttananon et al.

(10) Patent No.: US 8,862,119 B2
(45) Date of Patent: Oct. 14, 2014

(54) METHOD AND APPARATUS FOR TELECOMMUNICATIONS NETWORK PERFORMANCE ANOMALY EVENTS DETECTION AND NOTIFICATION

(75) Inventors: Channarong Tontinuttananon, Richardson, TX (US); Kuntaporn Saiyos, Kirkland, WA (US); Deborah Case, Dallas, TX (US); Peter Wenzel, Plano, TX (US); Aamir Sattar, Richardson, TX (US)

(73) Assignee: Rockstar Consortium US LP, Plano, TX (US)

(*) Notice: Subject to any disclaimer, the term of this patent is extended or adjusted under 35 U.S.C. 154(b) by 434 days.

(21) Appl. No.: 13/383,971

(22) PCT Filed: Jul. 15, 2010
(Under 37 CFR 1.47)

(86) PCT No.: PCT/US2010/042192
§ 371 (c)(1),
(2), (4) Date: Dec. 21, 2012

(87) PCT Pub. No.: WO2011/009000
PCT Pub. Date: Jan. 20, 2011

(65) Prior Publication Data
US 2013/0324111 A1 Dec. 5, 2013

Related U.S. Application Data

(60) Provisional application No. 61/225,672, filed on Jul. 15, 2009.

(51) Int. Cl.
*H04W 88/02* (2009.01)
*H04L 12/26* (2006.01)
*H04L 12/24* (2006.01)
*H04W 24/02* (2009.01)

(52) U.S. Cl.
CPC ............... *H04W 24/02* (2013.01); *H04L 43/16* (2013.01); *H04L 41/147* (2013.01); *H04L 41/16* (2013.01)
USPC ........................................................ 455/424

(58) Field of Classification Search
USPC .......... 455/424; 370/252, 235, 238, 275, 351, 370/352
See application file for complete search history.

(56) References Cited

U.S. PATENT DOCUMENTS 7,467,067 B2 12/2008 Marvasti
7,542,428 B1 6/2009 Johnson et al.
(Continued)

FOREIGN PATENT DOCUMENTS

EP 1 065 827 A1 1/2001

OTHER PUBLICATIONS

International Search Report, dated Sep. 21, 2010, issued in priority International Application No. PCT/US2010/042192.

*Primary Examiner* — Diane Mizrahi
(74) *Attorney, Agent, or Firm* — Saul Ewing LLP (57) ABSTRACT

In order to provide an early and more accurate determination of network problems, current NPI OMs are compared with samples of recent historical NPI OMs so that changes in the NPI OM are detected based on current overall network conditions rather than on conditions that may have existed at statistically insignificant earlier operational periods. By constantly adjusting a performance threshold, against which the current NPI OM is compared, by using a smaller and very recent sampling of NPIs (in the case of sudden and abrupt performance-NPI degradation detection) or a larger and greater number of NPIs over a wider time period (in the case of slow and persistent NPI degradation detection) to establish the threshold, detection results are more accurate and meaningful.

10 Claims, 4 Drawing Sheets

(56) References Cited

U.S. PATENT DOCUMENTS

| | | |
|---|---|---|
| 2008/0016412 A1 | 1/2008 | White et al. |
| 2014/0043977 A1* | 2/2014 | Wiley et al. .................. 370/235 |
| 2014/0064100 A1* | 3/2014 | Edwards et al. .............. 370/238 |

* cited by examiner

METHOD AND APPARATUS FOR TELECOMMUNICATIONS NETWORK PERFORMANCE ANOMALY EVENTS DETECTION AND NOTIFICATION

CROSS-REFERENCE TO RELATED APPLICATIONS

This application claims the priority of PCT/US2010/042192, filed on Jul. 15, 2010, which claims the priority of U.S. Provisional Application No. 61/225,672, filed Jul. 15, 2009, the entire contents of which are hereby incorporated fully by reference.

FIELD OF THE INVENTION

The invention pertains to the detection of network performance anomaly events based on Network Performance Indicator (NPI) Operational Measurements (OM).

BACKGROUND OF THE INVENTION

As communications technology has evolved, communications technology users have become increasingly reliant on the ability to communicate almost instantaneously with others all over the globe. With this technology seemingly available everywhere, users of network resources have come to perceive performance delays of as little as 2-3 seconds as unacceptable. Time delays in data transfers and dropped phone calls in mobile telephone systems irritate and alienate customers and thus, service providers try to pay close attention to performance problems and correct them as quickly as possible.

Operational Measurements (OM's) in the context of network performance are network parameters that are measured and used as Network Performance Indicators (NPI's). These measurements can include call success rates, call termination rates, Quality of Service (QOS) measurements, traffic and routing measurements, network outage statistics, and the like. These OM's are typically measured over a fixed period of time, referred to as "OM transfer periods".

Early detection of network performance anomalies could help avoid network outage events. A slow and persistent degradation of NPIs can indicate an issue such as memory leak. Additionally, simultaneous large abrupt and sudden changes in, for example, the call success rates from multiple NPIs can indicate the onset of outage events (the outage can be partial, i.e. losing >10% of capacity, or total outage). Therefore, it would be desirable to utilize the NPI process to help avoid or reduce the outage downtime of the network and other problems such as memory leak by devising a way to automatically process the NPIs to detect the occurrence of slow and persistent NPI OM degradation, severe and sudden degradation in NPI OM, and potential outage events and raise an appropriate log or alarm to alert the operator of the observed performance anomaly so that they can be investigated and dealt with in a timely manner.

There are many relevant existing stochastic process control algorithms that are routinely used in various industries to monitor product quality such as Shewhart, EWMA, and Page's CUSUM control charts. However, these standard quality control algorithms only deal with detecting deviations of the monitored quality metric from a fixed (known or unknown) mean value that is constant over time. In the NPI performance anomaly detection problem, the mean value of success rates can fluctuate slowly over time in normal operation (e.g., due to the change in traffic level or services usage pattern during the day), and thus only a statistically significant large and abrupt degradation, or a slow but steady degradation, from the most recent average success rates would indicate a possible onset of a new outage. This time-varying statistical characteristic of the NPI prevents direct application of these traditional stochastic process control algorithms.

SUMMARY OF THE INVENTION

In order to provide an early and more accurate determination of network problems, current NPI OMs are compared with samples of recent historical NPI OMs so that changes in the NPI OM are detected based on current overall network conditions rather than on conditions that may have existed at statistically insignificant earlier operational periods. By constantly adjusting a performance threshold, against which the current NPI OM is compared, by using a smaller and very recent sampling of NPIs (in the case of sudden and abrupt performance-NPI degradation detection) or a larger and greater number of NPIs over a wider time priod (in the case of slow and persistent NPI degradation detection) to establish the threshold, detection results are more accurate and meaningful.

Other aspects and features of the present invention will become apparent to those ordinarily skilled in the art upon review of the following description of specific embodiments of the invention in conjunction with the accompanying figures.

DETAILED DESCRIPTION OF THE EMBODIMENTS

The present invention will now be described in connection with an exemplary embodiment for a mobile (cellular) telephone network. However, it should be noted that the present invention is broadly applicable to many other types of network degradation detection schemes and to networks other than mobile telephone networks.

Figure 1:
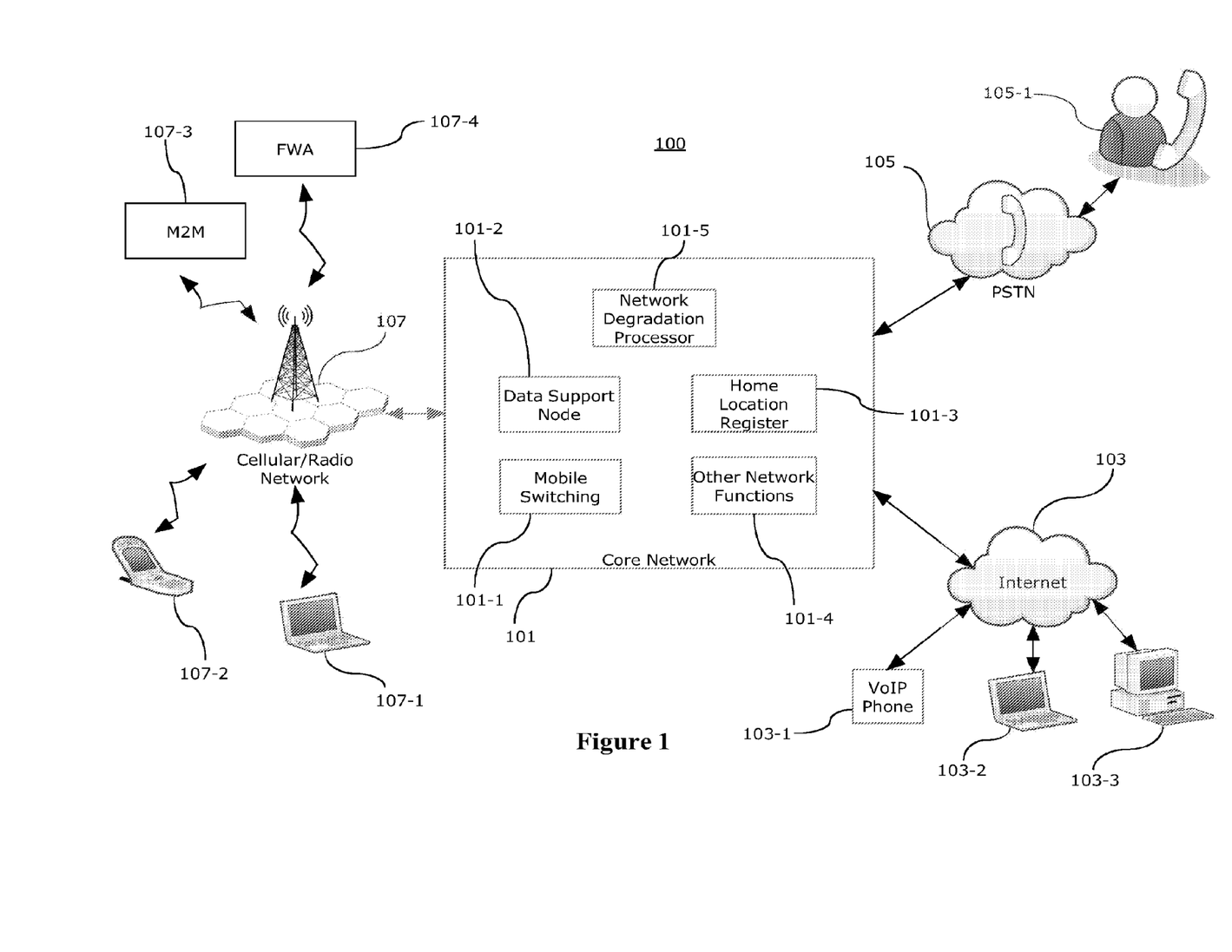
FIG. 1 illustrates a network environment that incorporates the claimed network degradation processor that is configured to perform the claimed steps of the invention.

FIG. 1 illustrates a network environment that incorporates the claimed network degradation processor that is configured to perform the claimed steps of the invention. As shown in FIG. 1, a network environment 100 includes a core network 101 coupled to an internet network 103, a PSTN network 105, and a cellular/radio network 107. Various communication interfaces are coupled to the networks to enable communication between users of the network. For example, a VoIP phone 103-1, and laptop computer 103-2, and a desktop computer 103-3 are coupled to the internet network 103; a landline telephone 105-1 is connected to PSTN network 105; and a laptop computer 107-1, a mobile telephone 107-2, a machine-to-machine device 107-3 and a fixed wireless access device 107-4 are coupled to cellular/radio network 107.

Core network 101 includes a mobile switching center 101-1, a data support node 101-2, a home location register 101-3, and other network functionality 101-4. In addition, however, core network 101 also includes network degradation detection processor 101-5, which can comprise a severe and abrupt NPI degradation detection node, an NPI slow and persistent degradation detection node, or a combination of both. Network degradation processor 101-5 is a processor that is configurable to perform the steps described in connection with FIGS. 2-4 and to perform the processes described herein.

Figure 2:
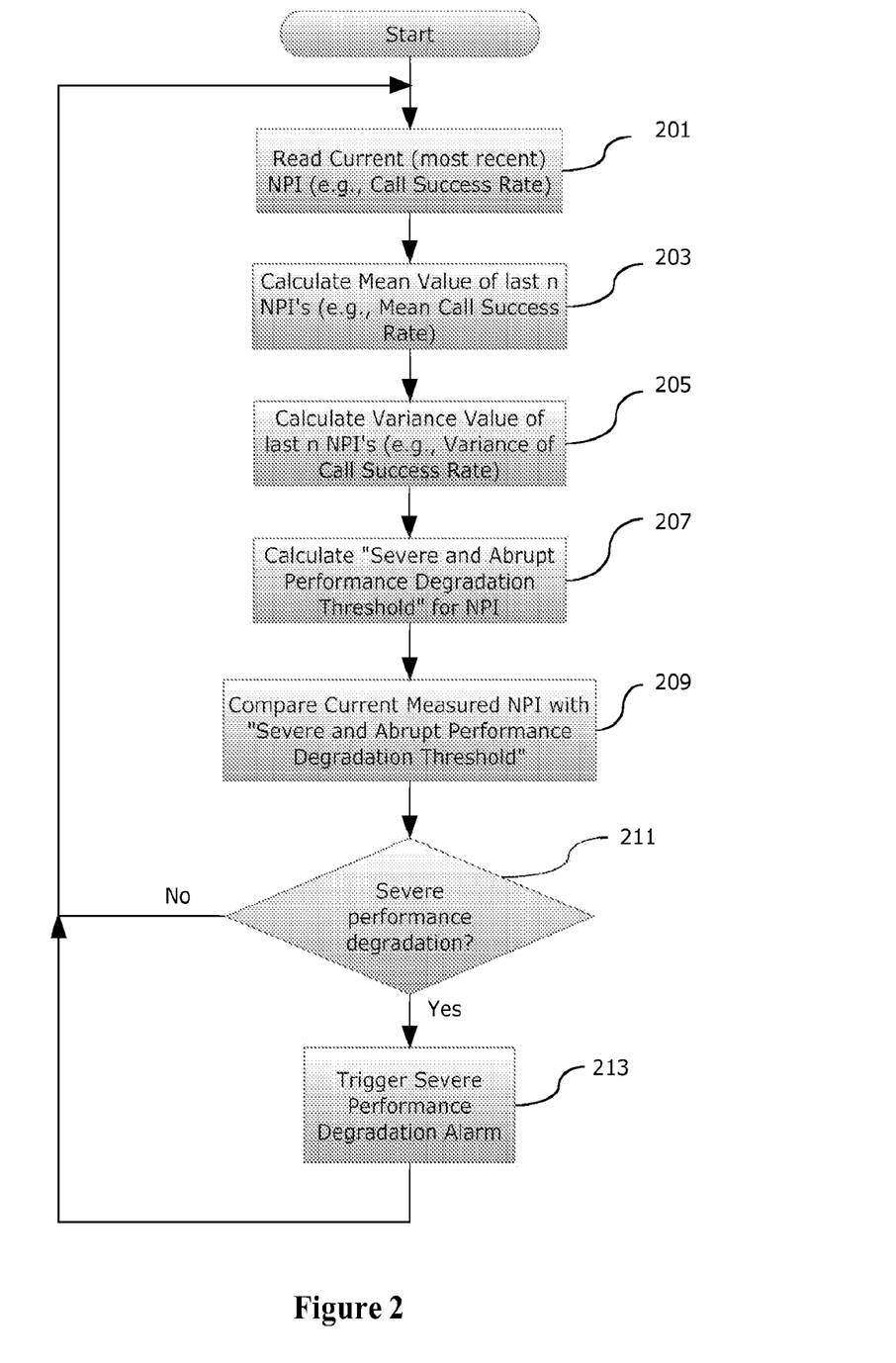
FIG. 2 is a flow diagram illustrating operation of a severe & abrupt NPI degradation detection node and rule in accordance with the principles of the present invention.

FIG. 2 is a flow diagram illustrating operation of a severe & abrupt NPI degradation detection node and rule in accordance with the principles of the present invention. In this example, the degradation detection is taking place in a mobile telephone network, but it is understood that the invention is not limited to this example. Specific exemplary algorithms for performing the steps described in connection with the figures are provided in later sections of this application.

As shown at step 201, processing begins by reading and storing the current (most recent) NPI OM, e.g., an operational measurement related to call success rate for the telephone network. In a typical large telephone network operating normally, call failures, SMS failures, handover failures etc, will be occurring every hour, but on a per-second basis, there typically will not be very many such failures. Thus, in such a system, the NPI OMs will be taken every few minutes, every 10 minutes, etc. It is understood that the choice of how often to take such measurements is within the discretion of the network operator.

At step 203, the mean (average) value of the last n immediately preceding NPI OMs is calculated by adding up the NPI OM values of the last n immediately-preceding NPI OMs and dividing the sum by n. For the purpose of detecting severe and abrupt degradation, the value of n is small, e.g., 2 or 3, so that the current NPI OM value is being compared to only the last few NPI OMs rather than a larger window spanning a larger time period. Thus, for example, if the network has NPI OMs taken every 10 minutes, and the current NPI OM value is taken at time t and if n is decided to be 3, then the NPI OM values at t-10 minutes, t-20 minutes, and t-30 minutes would be combined and then divided by 3 to determine the mean value for the purpose of step 203. In the example given above, it is suggested that the value of n should be small, e.g., 2 or 3. However, it is understood that the value of n can be changed depending on the needs of the network operator, and an n value of 10 could, for example, still be considered "small" for the purpose of this invention.

At step 205, the variance value of the last n NPI OMs is calculated by taking the standard deviation of the last n NPI OMs (the NPI OMs taken at t-10 minutes, t-20 minutes, and t-30 minutes in this example). As is clear, the processes of steps 103 and 105 are calculations of a moving average for the mean and variance values of the NPI OMs within the moving average window defined by the value of n.

At step 207, a Severe and Abrupt Performance Degradation Threshold (SAPDT) is calculated using the moving averages calculated in steps 203 and 205. The threshold essentially identifies what was, in this example, a "normal" rate of call success (and thus call failures) over the last n (3 in this example) NPI measurement periods and establishes a predetermined rate of call success (and failure) that will be considered as acceptable. Conversely, this also establishes the point at which the rate of call success (and failure) has become unacceptable. This enables a comparison of what was "normal" degradation over the previous n sample periods with what the current level of degradation is (described below with respect to steps 211 and 213. Specific examples of algorithms for performing the calculation of the SAPDT are provided later in this application.

At step 211, a comparison is made to determine if the current NPI OM has crossed the SAPDT, indicating the existence of a severe performance degradation relative to the current moving average window. If the comparison indicates the existence of a severe performance degradation, the process proceeds to step 213 where a severe performance degradation alarm is triggered, and any action desired can be taken by the network operator or other monitoring entity. If the comparison indicates no existence of a severe performance degradation, the process proceeds back to step 201, where the moving window is "moved" and the process begins again on the next current NPI and on the new set of n NPI OMs. Using the process of the embodiment described with respect to FIG. 2, the comparison is made based on a changing and up-to-date threshold, in contrast to prior art systems which use fixed and potentially out-of-date thresholds In another embodiment of the invention, described now with respect to FIG. 3, the severe performance degradation alarms are used to indentify a probable network outage. In the everyday operation of a network, certain conditions, for example, periods when heavy network traffic is experienced, may increase the number of certain NPI alarms for a particular NPI, but not for others. However, if within a particular NPI OM measurement period there are multiple NPI indicating severe performance degradation simultaneously, this could indicate a partial or complete network outage. In accordance with the operations described in connection with FIG. 3, the severe performance degradation alarms triggered using the process of FIG. 2 can be used to identify such network outage conditions and trigger a potential outage alarm so that measures can be taken to investigate and/or correct any problems that may be occurring.

Figure 3:
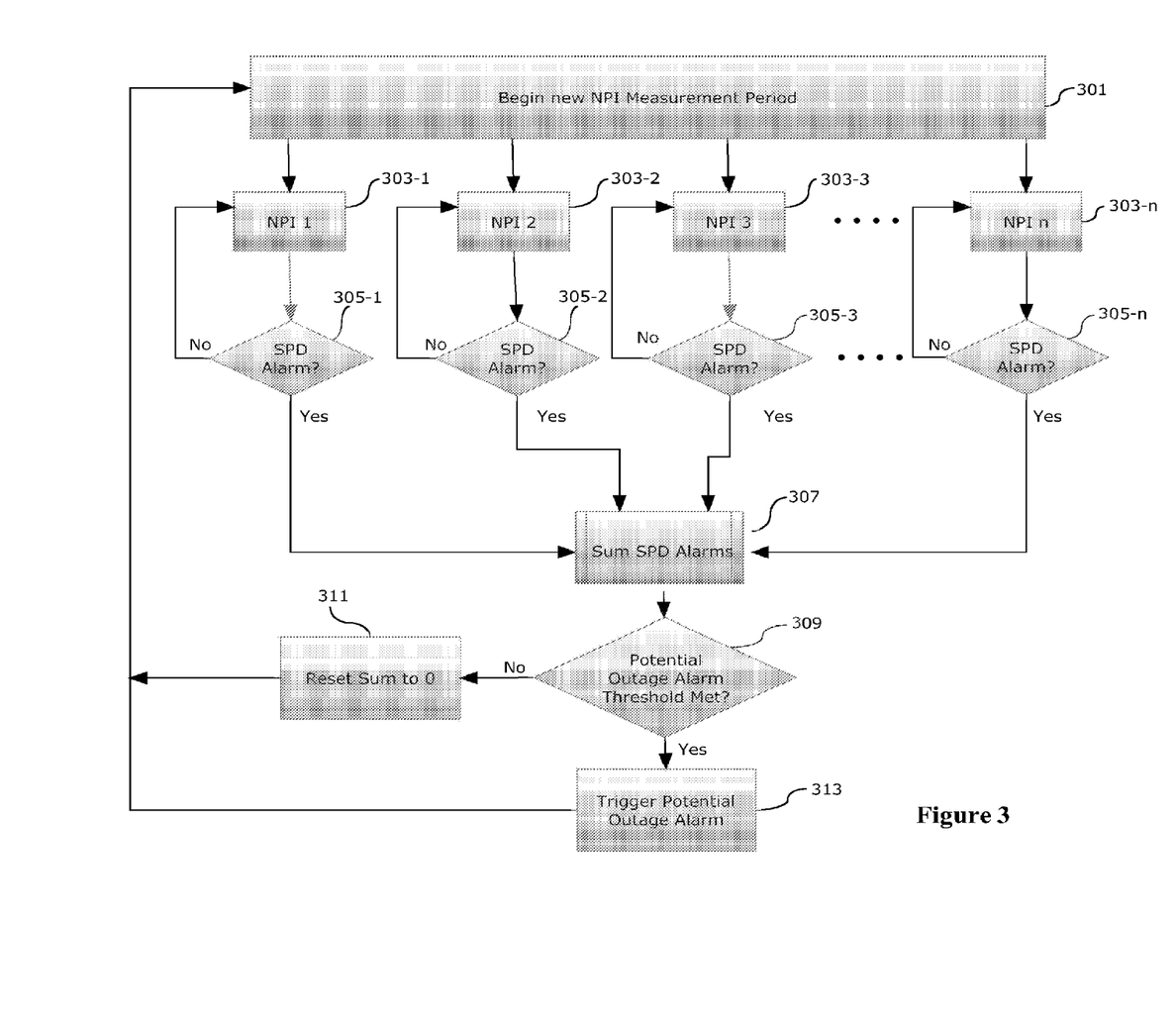
FIG. 3 is a flow diagram illustrating the severe performance degradation alarms used to indentify a probable network outage.

Referring to FIG. 3, Step 301 indicates the beginning of a new NPI OM measurement period. In this example, there are multiple NPI OMs taking place simultaneously, as indicated by steps 303-1, 303-2, 303-3, . . . 303-n (the value of n with regard to FIG. 3 corresponds to the number of NPI OMs being measured by the system). At steps 305-1, 305-2, 305-3, . . . 304-n, a determination is made as to whether or not a severe performance degradation (SPD) alarm has been issued for any of the NPIs being measured. The process for issuing or not issuing an SPD alarm for each NPI can follow the process described with respect to FIG. 2.

As can be seen, if an SPD alarm has been issued for a particular NPI OM, this fact is conveyed to a summing process 307 (for example, if an SPD alarm has been issued for a particular NPI, a "1" can be forwarded to the summing process 307, and if no SPD alarm has been issued for a particular NPI, a "0" can be forwarded to the summing process 307).

At step 307, the summing process determines how many of the NPI OMs are indicating an SPD condition as indicated by the issuance of an SPD alarm. At step 309, a determination is made as to whether or not a Potential Outage Alarm threshold had been met. This threshold can be arbitrarily set by the network operator so that a certain number of simultaneous SPD alarms during the same NPI measurement period must occur before an alarm condition is considered to exist. For example, if the Potential Outage Alarm threshold is set at 3, and the if the sytems is set to issue an Potential Outage Alarm if the threshold is exceeded, then if 4 or more NPI OMs cause SPD alarms to be triggered at the same time, at step 313 a potential outage alarm is issued so that investigations and/or corrective actions can be instituted, and then at step 311 the summing process 307 is reset. If the potential outage alarm threshold is not exceeded (i.e., if the number of SPD alarms issued for a particular NPI measurement period is 3 or less, at step 311 the summing process 307 is reset (e.g., the sum is returned to zero to await the next NPI measurement period data).

To summarize the operations performed by the processes of FIGS. 2 and 3, the process detects potential outages by detecting simultaneous large abrupt and sudden change in, for example, the call success rates from multiple NPIs. The false alarm probability is reduced while maximizing the probability of outage detection. Each NPI has a severe and abrupt performance degradation dynamic threshold which adapts to changes in the most recent mean and variance values of the NPI success rate. The severe and abrupt NPI degradation decision rule compares the most recent measurement of NPI call success rate against this dynamic threshold to determine if there is a statistically significant large and sudden change from the most recent mean value. If the NPI call success rate has dropped below the threshold, a severe performance degradation alarm is issued for that NPI. A Potential Outage Alarm is set whenever a pre-determined number of severe performance degradation alarms are raised in the same NPI measurement period.

An additional embodiment of the invention is described with reference to FIG. 4. An objective of this embodiment is NPI Slow & Persistent Degradation Detection Based on NPI Monitoring. Slow & persistent degradation of NPIs is detected to enable early detection of problems like memory leak and thus help reduce outage events. The process uses the uniformly most powerful (UMP) hypothesis testing to identify the slow & persistent NPIs degradation events. The UMP test is the test with highest detection probability under the constraint that the false alarm probability does not exceed a given value. In an example using call success rate as the NPI of interest, a slow & persistent NPI degradation decision rule compares a test statistic, which is a function of M most recent measurements of NPI call success rate, against a fixed threshold to determine if there is a statistically significant NPI degradation trend. If the test statistic at a time instant i drops below the threshold, the slow performance degradation alarm is issued for that NPI. If the slow performance degradation alarm is currently set and the test statistic at time instant i for that NPI is greater than the threshold, the slow performance degradation alarm is cleared for that NPI.

Figure 4:
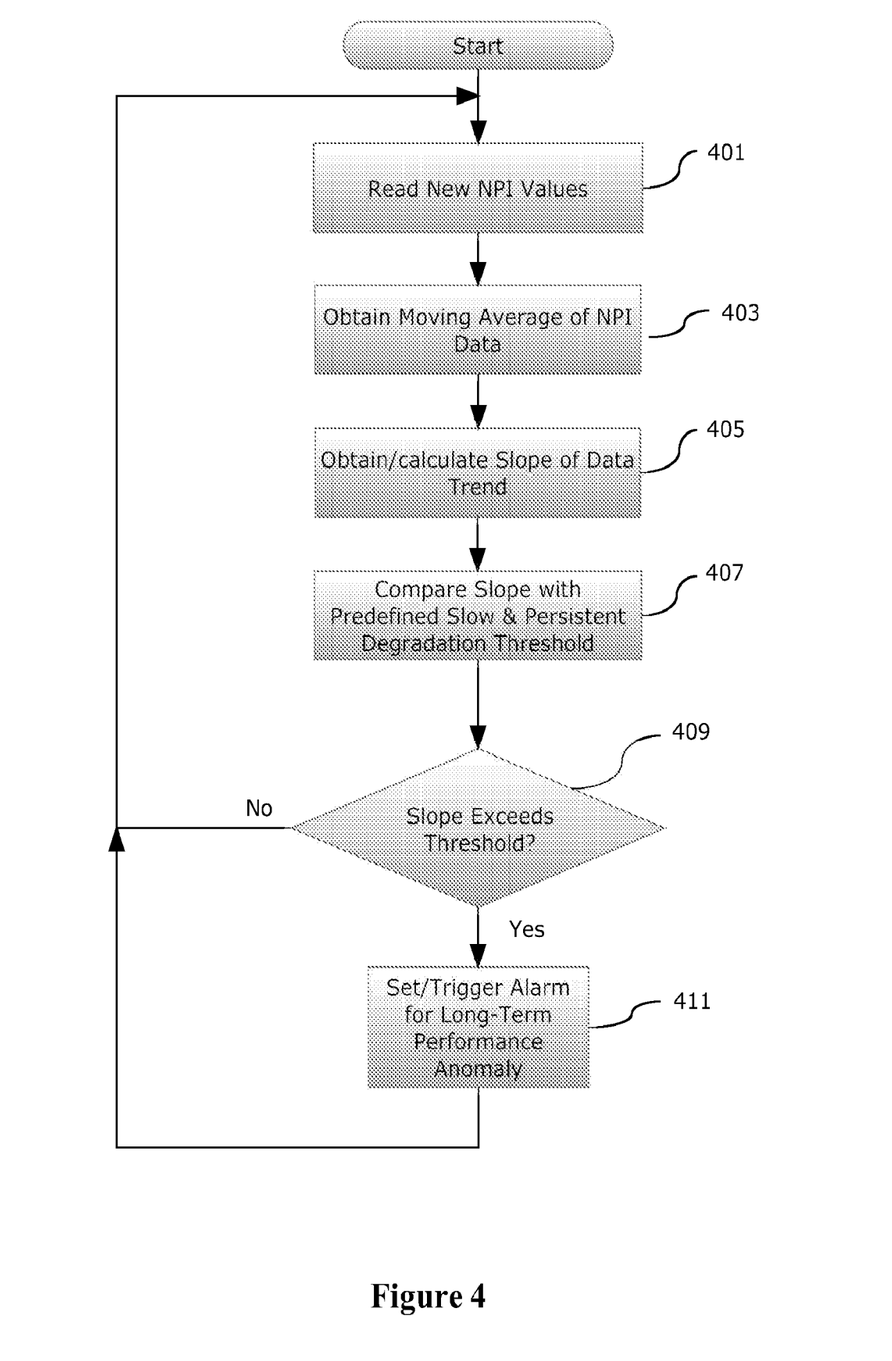
FIG. 4 is a flow diagram illustrating the operation of an NPI Slow & Persistent Degradation Detection node based on NPI Monitoring.

Referring to FIG. 4, at step 401, the most recent NPI value is read and stored by the system. At step 403, a moving average is obtained for the NPI data immediately preceding the current NPI value; however, in contrast to the embodiment of FIG. 2, in this embodiment, a larger window size is utilized, for example, the window could be of a size that would cover several days, weeks or months of NPI OMs. Although the exact number of NPI OMs that would be considered "large" is a decision left up to the network operator, it is contemplated that a "larger window" would comprise more than 10 NPI measurement periods beyond the time period t. The moving average can be obtained, for example, by low-pass filtering the data to smooth out the NPIs daily cycle fluctuation.

At step 407, the slope of the data trend line resulting from the smoothed data is determined by, for example using the linear least square fit for some or all of the data trend line. At step 409, the determined slope is compared with a predetermined Slope and Persistent Degradation threshold. At step 411, if the determined slope meets or exceeds the predetermined Slope and Persistent Degradation threshold, an Long Term Performance Anomaly alarm is triggered so that investigation and/or corrective measures can be taken. If at step 411 it is determined that the determined slope does not meet or exceed the threshold, the process continues back to step 401 to perform the same steps for the next current NPI value.

For any of the alarm conditions described with respect to FIGS. 2-4, the resetting of the alarms can be triggered by using similar processes that essentially flip the process around so that the threshold levels to be met are indicative of a recovery in performance (abatement) rather than a problem with performance.

What follows are examples of specific algorithms and elements that can be used to perform the processes described in FIGS. 2-4.

1. Summary

An NPI OMs dynamic thresholding approach is described that automatically detects an onset/abatement of network performance anomaly events utilizing Network Performance Indicators Operation Measurement (NPI OMs) as input data. Network performance anomaly events considered in this document are the following:

1. Severe and abrupt degradation of the NPI OM,
2. Potential network outage events,
3. Slow and persistent degradation of the NPI OM.

The following are the NPI performance anomaly onset and abatement events defined in this algorithm:

A1i) Severe and abrupt performance degration event detected for the ith NPI
A2i) Slow and persistent performance degradation event detected for the ith NPI
A3) Network outage event detected (detection of simultaneous severe and abrupt performance degration from the NPIs in some non-empty set K
R1i) Severe and abrupt performance anomaly event recovery detected for the ith NPI
R2i) Slow and persistent performance anomaly event recovery detected fro the ith NPI
R3) Network outage event recovery detected (detection of recovery from performance degradation for every NPIs in non-empty set K
R4i) Recovery to long term average performance event detected for the ith NPI

TABLE 1

NPI log, set/clear alarm behaviors based on network states

| Conditions | Set/Clear Alarm | Information Log |
|---|---|---|
| A1$_i$ or A2$_i$ | Set network performance anomaly alarm for the i$^{th}$ NPI | If A1$_i$, then generate severe and abrupt perf. degrad. detection Info Log for the i$^{th}$ NPI. If A2$_i$, then generate slow and persistent perf. degrad. detection Info Log for the i$^{th}$ NPI. |
| R1$_i$ | | Generate severe and abrupt perf. degrad. recovery detection Info Log for the i$^{th}$ NPI. |
| R2$_i$ | | Generate slow and persistent perf. degrad. recovery detection Info Log for the i$^{th}$ NPI. |
| R4$_i$ | | Generate recovery to long term average perf. detection Info Log for the i$^{th}$ NPI. |
| R1$_i$ and R2$_i$ and R4$_i$ | Clear network performance anomaly alarm for the i$^{th}$ NPI | Generate NPI perf. anomaly recovery detection Info Log for the i$^{th}$ NPI |
| A3 | Set potential network outage event alarm | Generate potential network outage event due to simultaneous severe and abrupt perf. degrad. Detected for NPIs in set J Info Log. |
| R3 | Clear potential network outage event alarm | Generate recovery from potential network outage event Info Log. |

2. Introduction

G/U and CDMA Voice Core Network Performance Indicator (NPI) process provides measurement of various call success rates at the end of every k OM transfer periods. A low and persistent degradation of NPIs can indicate an issue such as memory leak. Early detection of the network performance anomaly problem could help avoid network outage events. Additionally, simultaneous large abrupt and sudden changes in the call success rates from multiple NPIs can indicate the onset of an outage event (the outage can be partial, i.e., losing >10% of capacity, or total outage), therefore, it is of interest to utilize the NPI process to help avoid or reduce the outage downtime of the network by devising an algorithm to automatically process the NPIs data in order to detect occurrence of slow and persistent NPI OM degradation, severe and sudden degradation in NPI OM, and potential outage events and raise an appropriate log or alarm to alert the operator of the observed performance anomaly so that they can be investigated and dealt with in a timely manner.

3. Detection of Severe and Abrupt NPI Degradation and Potential Outage Event

An algorithm for detecting severe and abrupt degradation of NPI and the detecting a potential outage event is summarized in the next two Sections. Section 4.1 presents an algorithm assuming floating point arithmetic is used whereas Section 4.2 present an algorithm when the calculation is to be performed using integer arithmetic.

3.1 Summary of the Severe and Abrupt NPI Degradation/Outage

Detection Algorithm (Floating Point Implementation)

0) Initialization: Define the ordering of the M NPI, e.g., m=1 for the Mobile Originated call success rate, m=2 or the Land Originated call success rate, etc. Then,
read in the first NPI call success rates measurement, $u_{m,current}$, m=1, 2, . . . , M, and set $$c = 3,$$
$$\lambda = 0.8,$$
$$b = 1 + \left[\frac{(1-\lambda)(2+\lambda)}{1+\lambda}\right]^{\frac{1}{2}}$$

values of the m-th NPI sever and abrupt NPI degradation secondary threshold; $g_m=0$, m=1, 2, . . . , M
values of the m-th NPI performance anomaly set alarm indicator; $p_m=0$, m=1, 2, . . . , M
values of the set outage alarm indicator; P=0
values of the m-th NPI call success rates; $u_{m, previous}=u_{m, current}$, m=1, 2, . . . , M
values of the weighted mean of m-th NPI; $w_{m, current}=u_{m, current}$, $w_{m, previous}=u_{m, current}$, m=1, 2, . . . , M
values of the standard variation of m-th NPI; $\sigma_{m, current}=1/b$, $\sigma_{m, previous}=1/b$, m=1, 2, . . . , M
values of the severe and abrupt NPI degradation thresholds; $T_m=0$, m=1, 2, . . . M. (This will suppress the outage alarm at the next decision instant after initialization.)
values of the severe and abrupt NPI degradation abatement thresholds; $Z_m=100$, m=1, 2, . . . , M.
value of the outage detection threshold; $T_{outage}=3$
values of the abrupt change decision function value; $d1_m=0$, m=1, 2, . . . M
value of the outage decision function value; D=0 (i.e., no outage alarm at initialization.)

1) At the next NPI measurement time instant, read in the new NPI values, $u_{m,current}$, m=1, 2, . . . , M 2) For m=1, 2, . . . , M, set the abrupt change decision function value $$d1_m = \begin{cases} 0, & \text{if } u_{m,current} \geq Z_m \begin{pmatrix} \text{there is no sudden} \\ \text{change of the } m^{th} NPI \end{pmatrix} \\ d1m, & \text{if } T_m \leq u_{m,current} < Z_m \begin{pmatrix} \text{there is no change} \\ \text{of the } m^{th} NPI \text{ alarm state} \end{pmatrix} \\ 1, & \text{if } u_{m,current} < T_m \begin{pmatrix} \text{there is a sudden change} \\ \text{of the } m^{th} NPI \end{pmatrix} \end{cases}$$

3) For m=1, 2, . . . M, if $d1_m=1$ and $p_m=0$, issue an alarm for m-th NPI performance anomaly and set $p_m=1$, $g_m=u_{m,previous}-10$ 4) Compute the outage decision function value $$D = \begin{cases} 0, & \text{if } \sum_{i=1}^{M} d1_m = 0 \begin{pmatrix} \text{no outage in this} \\ NPI \text{ measurement interval} \end{pmatrix} \\ D, & \text{if } 0 < \sum_{i=1}^{M} d1_m < T_{outage} \begin{pmatrix} \text{no change} \\ \text{in outage state} \end{pmatrix} \\ 1, & \text{if } \sum_{i=1}^{M} d1_m \geq T_{outage} \begin{pmatrix} \text{possible outage in this} \\ NPI \text{ measurement interval} \end{pmatrix}. \end{cases}$$

5) If D=1 and P=0, issue an alarm for possible outage and set P=1
6) If D=0 and P=1, clear outage alarm and set P=0
7) For m=1, 2, . . . M, set $w_{m,current}=\lambda u_{m,current}+(1-\lambda) w_{m,previous}$
8) For m=1, 2, . . . M, set $$\sigma_{m,current} = \begin{cases} \min\left\{b\sigma_{m,prev}, \lambda\sigma_{m,prev.} + (1-\lambda)\frac{(u_{m,curr} - u_{m,prev.})^2}{2}\right\}, \\ 1/b, \text{ if } \sigma_{m,previous} < 1/b \end{cases}$$

if $\sigma_{m,prev.} \geq 1/b$ where $$\min\{a, b\} = \begin{cases} a, \text{ if } a \leq b, \\ b, \text{ if } b < a \end{cases}$$

9) For m,=1, 2, . . . M, set the severe and abrupt NPI degradation onset/abatement thresholds $$T_m = \max\left\{0, w_{m,previous} - \max\left\{c\sigma_{m,previous}\sqrt{\left(\frac{\lambda}{2-\lambda}\right)}, 10\right\}\right\}$$

$$Z_m = \max\left\{\min\left\{100, w_{m,previous} + \min\left\{c\sigma_{m,previous}\sqrt{\left(\frac{\lambda}{2-\lambda}\right)}, 10\right\}\right\}, g_m\right\}$$

where $$\max\{a, b\} = \begin{cases} a, \text{ if } a \geq b, \\ b, \text{ if } b > a \end{cases}$$

10) Set $u_{m,previous}=u_{m,current}$, m=1, 2, . . . M
11) Set $w_{m,previous}=w_{m,current}$, m=1, 2, . . . M
12) Set $\sigma_{m,previous}=\sigma_{m,current}$, m=1, 2, . . . M
13) Repeat step 1).

3.2 Summary of a Severe & Abrupt NPI Degradation/Outage Detection Algorithm (Integer Arithmetic Implementation)

0) Initialization: Define the ordering of the M NPI, e.g. m=1 for the Mobile Originated call success rate, m=2 or the Land Originated call success rate, etc. Then, read in the first NPI call success rates measurement, $u_{m,current}$, m=1, 2, . . . , M, and set $$c = 3,$$
$$\lambda = 80,$$
$$b = 100 + \left[\frac{(100(100-\lambda)(200+\lambda)}{100+\lambda}\right]^{\frac{1}{2}}$$
$$= 156$$

values of the m-th NPI severe and abrupt NPI degradation secondary threshold; $g_m=0$, m=1, 2, . . . , M values of the m-th NPI performance anomaly set alarm indicator; $p_m=0$, m=1, 2, . . . , M values of the set outage alarm indicator; P=0 values of the m-th NPI call success rates; $u_{m,previous}=u_{m,current}$, m=1, 2, . . . , M values of the weighted mean of the m-th NPI; $w_{m,current}=u_{m,current}$, $w_{m,previous}=u_{m,current}$, m=1, 2, . . . , M values of the standard variation of m-th NPI; $\sigma_{m,current}=10000/b=64$, $\sigma_{m,previous}=10000/b=64$, m=1, 2, . . . , M values of the severe and abrupt NPI degradation thresholds; $T_m=0$, m=1, 2, . . . , M. (This will suppress the outage alarm at the next decision instant after initialization.)

values of the severe and abrupt NPI degradation abatement thresholds; $Z_m=100$, m=1, 2, . . . , M.

value of the outage detection threshold; $T_{outage}=3$ values of the abrupt change decision function value; $d1_m=0$, m=1, 2, . . . , M value of the outage decision function value; D=0 (i.e., no outage alarm at initialization.)

1) At the next NPI measurement time instant, read in the new NPI values, $u_{m,current}$, m=1, 2, . . . , M 2) For m=1, 2, . . . , M, set the abrupt change decision function value $$d1_m = \begin{cases} 0, & \text{if } u_{m,current} \geq Z_m \begin{pmatrix} \text{there is no sudden} \\ \text{change of the } m^{th} NPI \end{pmatrix} \\ d1m, & \text{if } T_m \leq u_{m,current} < Z_m \begin{pmatrix} \text{there is no sudden change} \\ \text{of the } m^{th} NPI \text{ alarm state} \end{pmatrix} \\ 1, & \text{if } u_{m,current} < T_m \begin{pmatrix} \text{there is a sudden change} \\ \text{of the } m^{th} NPI \end{pmatrix} \end{cases}$$

3) For m=1, 2, . . . M, if $d1_m=1$ and $p_m=0$, issue an alarm for m-th NPI performance anomaly and set $p_m=1$, $g_m=u_{m,previous}-10$ 4) Compute the outage decision function value $$D = \begin{cases} 0, & \text{if } \sum_{i=1}^{M} d1_m = 0 \begin{pmatrix} \text{no outage in this} \\ NPI \text{ measurement interval} \end{pmatrix} \\ D, & \text{if } 0 < \sum_{i=1}^{M} d1_m < T_{outage} \begin{pmatrix} \text{no change} \\ \text{in outage state} \end{pmatrix} \\ 1, & \text{if } \sum_{i=1}^{M} d1_m \geq T_{outage} \begin{pmatrix} \text{possible outage in this} \\ NPI \text{ measurement interval} \end{pmatrix} \end{cases}$$

5) If D=1 and P=0, issue an alarm for possible outage and set P=1

6) If D=0 and P=1, clear outage alarm and set P=0

7) For m=1, 2, . . . M, set $$w_{m,current} = \frac{\lfloor \lambda u_{m,current} + (100-\lambda) w_{m,previous} \rfloor}{100}$$
$$= \frac{\lfloor 80 u_{m,current} + 20 w_{m,previous} \rfloor}{100}$$

8) For m=1, 2, . . . M, set $$\sigma_{m,current} = \begin{cases} \frac{\min\left\{b\sigma_{m,prev.}, +\frac{100(100-\lambda)}{2}\right\}}{(u_{m,curr.} - u_{m,prev.})^2}, & \text{if } \sigma_{m,prev.} \geq 10000/b \\ 10000/b, & \text{if } \sigma_{m,previous} < 10000/b \end{cases}$$

$$= \begin{cases} \frac{\min\left\{156\sigma_{m,prev.}, 80\sigma_{m,prev.} + \atop 1000(u_{m,curr.} - u_{m,prev.})^2\right\}}{100}, & \text{if } \sigma_{m,prev.} \geq 64 \\ 64, & \text{if } \sigma_{m,previous} < 64 \end{cases}$$

where $$\min\{a, b\} = \begin{cases} a, & \text{if } a \leq b, \\ b, & \text{if } b < a \end{cases}$$

9) For m=1, 2, . . . M, set the severe and abrupt NPI degradation onset/abatement thresholds $$T_m = \max\left\{0, w_{m,previous} - \max\left\{\frac{c\sigma_{m,previous}\sqrt{\left(\frac{10000\lambda}{200-\lambda}\right)}}{10000}, 10\right\}\right\}$$

$$= \max\left\{0, w_{m,previous} - \max\left\{\frac{245\sigma_{m,previous}}{10000}, 10\right\}\right\}$$

$$Z_m = \max\left\{\min\left\{100mw_{m,previous} + \min\left\{\frac{c\sigma_{m,previous}\sqrt{\left(\frac{10000\lambda}{200-\lambda}\right)}}{10000}, 10\right\}\right\}, g_m\right\}$$

$$= \max\left\{\min\left\{100, w_{m,previous} + \min\left\{\frac{245\sigma_{m,previous}}{10000}, 10\right\}\right\}, g_m\right\}$$

where $$\max\{a, b\} = \begin{cases} a, & \text{if } a \geq b, \\ b, & \text{if } b > a \end{cases}$$

10) Set $u_{m,previous}=u_{m,current}$, m=1, 2, . . . M

11) Set $w_{m,previous}=w_{m,current}$, m=1, 2, . . . M

12) Set $\sigma_{m,previous}=\sigma_{m,current}$, m=1, 2, ... M
13) Repeat step 1).
4. Slow and Persistent NPI Degradation Detection Algorithm
    4.1 Summary of a Slow and Persistent NPI Degradation Detection Algorithm (Floating Point Implementation)
    0) Initialization: Use the same ordering of the M NPI as in the severe & abrupt NPI degradation/outage detection algorithm. Then initializes
        values of the NPI OM moving average window; W=100
        values of the slow and persistent NPI degradation moving test window; N=50
        values of the m-th NPI slow and persistent degradation test statistics; $Q_m$=0, m=1, 2, ..., M
        values of the minimum negative slop threshold of –3% per week, $b_o$=

$$-\frac{3}{7 \times 24}$$

values of the W present and past m-th NPI values; $u_{mj}$=–1, j=0, 1, ..., W, m=1, 2, ..., M; $u_{m,new}$=0, m=1, 2, ... M
        values of the N m-th NPI average values; $y_{mj}$=–1, j=0, 1, ..., N, m=1, 2, ..., M $$D = \frac{N^2(N+1)(N-1)}{12} 520625$$

$$S_{uu}^{(m)} = \sqrt{\frac{D}{N}}$$
$$= 102.042, m = 1, 2, \ldots, M$$

values of the m-th NPI performance anomaly set alarm indicator; $p_m$=0, m=1, 2, ..., M
        values of the slow and persistent NPI degradation decision function value; $d2_m$=0, m=1, 2, ..., M
        values of the slow and persistent NPI degradation detection threshold; $T_{slow}$=–1.6772
    1) At the next NPI measurement time instant, read in the new NPI values, $u_{m,new}$, m=1, 2, ... M
    2) For m=1, 2, ... M, update the set of W+1 present and past m-th NPI values
        for j=0: W–1, set $u_{mj}=u_{mj+1}$, end
        $u_{m,W}=u_{m,new}$
    3) For m=1, 2, ... M, if $u_{m,0} \neq$ –1, update the set of N m-th NPI average values
        for j=1: N–1, set $y_{mj}=y_{mj+1}$, end $$Y_{m,N} = \frac{W y_{m,N} - u_{m,0} = u_{m,W}}{W}$$

4) For m=1, 2, ... M, if $y_{m,j} \neq$ –1, update the m-th NPI slow and persistent degradation test statistics $Q_m$:

$$A_m = \frac{\frac{N(N+1)(2N+1)}{6}\left(\sum_{j=1}^{N} y_{m,j}\right) - \frac{N(N+1)}{2}\left(\sum_{j=1}^{N} jy_{m,j}\right)}{D}$$

-continued $$B_m = \frac{N\left(\sum_{j=1}^{N} jy_{m,j}\right) - \frac{N(N+1)}{2}\left(\sum_{j=1}^{N} y_{m,j}\right)}{D}$$

$$S_m = \sqrt{\frac{\sum_{j=1}^{N}(y_{m,j} - A_m - jB_m)^2}{N-2}}$$

$$Q_m = \frac{(B_m - b_0)S_{uu}^{(m)}}{S_m}$$

5) For m=1, 2, ... M, if $y_{m,i}$=–1, set the slow and persistent NPI degradation decision function value $$d2_m = \begin{cases} 0, & \text{if } Q_m \geq T_{slow} \quad \left(\begin{array}{l}\text{there is no slow change} \\ \text{of the } m^{th} \text{ NPI}\end{array}\right) \\ 1, & \text{if } Q_m < T_{slow} \quad \left(\begin{array}{l}\text{there is a slow change} \\ \text{of the } m^{th} \text{ NPI}\end{array}\right) \end{cases}$$

6) For m=1, 2, m ... M, if $d2_m$=1 and $_{Pm}$=0, issue an alarm for m-th NPI performance anomaly and set $p_m$=1
    7) Repeat step 1).
    4.2 Summary of a Slow and Persistent NPI Degradation Detection Algorithm (Integer Arithmetic Implementation: Signed 32 Bits)
    0) Initialization: Use the same ordering of the M NPI as in the severe & abrupt NPI degradation/outage detection algorithm, then initializes
        values of the NPI OM moving average window; W=100
        values of the slow and persistent NPI degradation moving test window; N=50
        values of the m-th NPI slow and persistent degradation test statistics; $Q_m$=0, m=1, 2, ..., M
        values of the W present and past m-th NPI values; $u_{mj}$=–1, j=0, 1, ..., W, m=1, 2, ..., M; $u_{m,new}$=0, m=1, 2, ... M
        values of the N m-th NPI average values; $y_{mj}$=–1, j=0, 1, ... N, m=1, 2, ..., M
        value of the integer scale factor; G=1000
        values of the minimum negative slop threshold of –3% per week, $$b_0 = -\frac{3G}{7 \times 24}$$
$$= -18$$

$$D = \frac{N^2(N+1)(N-1)}{12}$$
$$= 520625$$

$$s_{uu}^{(m)} = G\sqrt{\frac{D}{N}}$$
$$= 102042,$$
$$m = 1, 2, \ldots, M$$

values of the m-th NPI performance anomaly set alarm indicator; $p_m$=0, m=1, 2, ..., M
        values of the slow and persistent NPI degradation decision function value; $d2_m$=0, m=1, 2, ..., M
        values of the slow and persistent NPI degradation detection threshold; $T_{slow}$=–1677

1) At the next NPI measurement time instant, read in the new NPI values, $u_{m,new}$, m=1, 2, . . . M
2) For m=1, 2, . . . M, update the set of W+1 present and past m-th NPI values
for j=0: W−1, set $u_{mj}=u_{mj+1}$, end
$u_{m,W}=U_{m,new}$
3) For m=1, 2, . . . M, if $u_{m,0} \neq -1$, update the set of N m-th NPI average values for $j=1:N-1$, set $y_{mj}=y_{mj+1}$, end $$y_{m,N} = \frac{Wy_{n,N} - 100u_{m,0} + 100u_{m,W}}{W}$$

$$= y_{m,N} + \frac{100}{W}(u_{m,W} - u_{m,0})$$

4) For m=1, 2, . . . M, if $y_{m,j} \neq -1$, update the m-th NPI slow and persistent degradation test statistics $Q_m$:

$$A_m = \frac{2(2N+1)\left(\frac{\sum_{j=1}^{N} y_{m,j}}{10}\right) - 6\left(\frac{\sum_{j=1}^{N} y_{m,j}}{10}\right)}{N(N-1)}$$

$$B_m = \frac{12\left(\frac{\sum_{j=1}^{N} jy_{m,j}}{10}\right) - 6(N+1)\left(\frac{\sum_{j=1}^{N} y_{m,j}}{10}\right)}{N(N+1\_(N-1))}$$

$$S_m = \sqrt{\frac{100\sum_{j=1}^{N}(y_{m,j} - 10A_m - 10jB_m)^2}{N-2}}$$

$$Q_m = \frac{(100B_m - b_0)S_{uu}^{(m)}}{S_m}$$

$$= \frac{(100B_m + 28)S_{uu}^{(m)}}{S_m}$$

5) For m=1, 2, . . . M, if $y_{m,j} \neq -1$, set the slow and persistent NPI degradation decision function value $$d2_m = \begin{cases} 0, & \text{if } Q_m \geq T_{slow} \quad \begin{pmatrix} \text{there is no slow change} \\ \text{of the } m^{th} \text{ NPI} \end{pmatrix} \\ 1, & \text{if } Q_m < T_{slow} \quad \begin{pmatrix} \text{there is a slow change} \\ \text{of the } m^{th} \text{ NPI} \end{pmatrix} \end{cases}$$

6) For m=1, 2, m . . . M, if $d2_m=1$ and $p_m=0$, issue an alarm for m-th NPI performance anomaly and set $p_m=1$
7) Repeat step 1).

5. Recovery of NPI Long Term Average Performance Detection Algorithm

Once the system has entered the network performance anomaly state and the alarm has been set, in order to declare that the network performance anomaly event has abated and the system has entered the 'normal' state it is necessary to make sure that the system performance has reverted back to its most recent long term average performance. To achieve this recovery detection goal, a test statistic constructed from a 7-day moving average estimate of the mean and variance of each of the NPI OMs can be used. Suppose there are J samples of the OMs over the 7-day period, then the sample mean value of the m-th NPI at the time instant k is given by $$l_{m,k} = \frac{1}{J}\sum_{i=k-J+1}^{k} u_{m,i}$$

$$= \frac{Jl_{m,k-1} - u_{k-J} + u_{m,k}}{J}.$$

Let $q_{m,k} = \sum_{i=k-J+1}^{k} u_{m,i}^2$, then the sample variance of the m-th NPI at the time instant k is given by $$L_{m,k} = \frac{1}{J-1}\sum_{i=k-J+1}^{k}(u_{m,i} - l_{m,k})^2$$

$$= \frac{1}{J-1}\left(\sum_{i=k-J+1}^{k} u_{m,i}^2 - Jl_{m,k}^2\right)$$

$$= \frac{1}{J-1}(q_{m,k-1} - u_{m,k-J}^2 + u_{m,k}^2 - Jl_{m,k}^2).$$

With the above recursive relations for sample mean and sample variance, it is straight forward to construct a recovery to long term performance detection algorithm.

5.1 Summary of a Recovery of NPI Long Term Average Performance Detection Algorithm (Floating Point Implementation)

0.a) Initialization Option 1 (Without using data from prior to the start time of the algorithm): Use the same ordering of the M NPI as in the severe & abrupt NPI degradation/outage detection algorithm. Then initializes values of the NPI OM moving average window is the number of samples during a 7-day period; J values of the m-th NPI long term average performance recovery threshold; $V_m=0$, m=1, 2, . . . , M values of the J present and past m-th NPI; $u_{mj}=-1$, j=0, 1, . . . , J 0, 1, . . . , J, m=1, 2, . . . , M; $u_{m,new}=0$, m=1, 2, . . . M values of the m-th NPI sample average; $l_m=-1$, m=1, 2, . . . , M values of the m-th NPI sum of square; $q_m=J^2$, m=1, 2, . . . , M values of the m-th NPI sample variance; $L_M=0$, m=1, 2, . . . , M values of the m-th NPI long term average performance recovery decision function value; $d3_m=0$, m=1, 2, . . . , M 1) At the next NPI measurement time instant, read in the new NPI values, $u_{m,new}$, m=1, 2, . . . M
2) For m=1, 2, . . . M, update the set of J+1 present and past m-th NPI values
for j=0: J−1, set $u_{mj}=u_{mj+1}$, end
$u_{m,J}=u_{m,new}$
3) For m=1, 2, . . . M, if $u_{m,0} \neq -1$, update the m-th NPI sample average values $$l_m = \frac{Jl_m - u_{m,0} + u_{m,J}}{J}$$

4) For m=1, 2, ... M, if $u_{m,0} \neq -1$, update the m-th NPI sample variance values $$L_m = \frac{1}{J-1}(q_m - u_{m,0}^2 + u_{m,J}^2 - Jl_m^2)$$

5) For m=1, 2, ... m, if $u_{m,0} \neq -1$, update the m-th NPI sample sum of squares values $$q_m = q_m - u_{m,0}^2 + u_{m,J}^2$$

6) For m=1, 2, ... M, if $l_m \neq 100$, update the m-th NPI long term average performance recovery threshold $V_m$:

$$V_m = \max\{0, l_m - 3\sqrt{L_m}\}$$

For m=1, 2, . . . M, if $l_m \neq 100$, set the long term average performance recovery decision function value $$d3_m = \begin{cases} 0, & \text{if } u_{m,new} \geq V_m \quad \begin{pmatrix} \text{recovery of long term} \\ \text{average performance } m^{th} \text{ NPI} \end{pmatrix} \\ 1, & \text{if } u_{m,new} < V_m \quad \begin{pmatrix} \text{long term average performance} \\ \text{has not recovered yet } m^{th} \text{ NPI} \end{pmatrix} \end{cases}$$

7) Repeat step 1).

5.2 Summary of a Recovery of NPI Long Term Average Performance Detection Algorithm (Integer Arithmetic Implementation)

0) Initialization: Use the same ordering of the M NPI as in the severe & abrupt NPI degradation/outage detection algorithm. Then initializes
values of the NPI OM moving average window is the number of samples during a 7-day period; J
values of the m-th NPI long term average performance recovery threshold; $V_m=0$, m=1, 2, . . . , M
values of the J present and past m-th NPI; $u_{mj}=-1$, j=0, 1, . . . , J, m=1, 2, . . . , M; $u_{m,new}=0$, m=1, 2, . . . M
values of the m-th NPI sample average; $l_m=100$, m=1, 2, . . . , M
values of the m-th NPI sum of square; $q_m=0$, m=1, 2, . . . , M
values of the m-th NPI sample variance; $L_m=0$, m=1, 2, . . . , M
values of the m-th NPI long term average performance recovery decision function value; $d3_m=0$, m=1, 2, . . . , M 1) At the next NPI measurement time instant, read in the new NPI values, $u_{m,new}$, m=1, 2, . . . M 2) For m=1, 2, . . . M, update the set of J+1 present and past m-th NPI values
for j=0: J−1, set $u_{mj}=u_{mj+1}$, end
$u_{m,J}=u_{m,new}$ 3) For m=1, 2, . . . M, if $u_{m,0} \neq -1$, update the m-th NPI sample average values $$l_m = \frac{Jl_m - 100u_{m,0} + 100u_{m,J}}{J}$$

4) For m=1, 2, . . . M, if $u_{m,0} \neq -1$, update the m-th NPI sample variance values $$Lm = \frac{1}{J-1}(q_m - 10000u_{m,0}^2 + 10000u_{m,J}^2 - Jl_m^2)$$

5) For m=1, 2, . . . M, if $u_{m,0} \neq -1$, update the m-th NPI sample sum of square values $$q_m = q_m - 10000u_{m,0}^2 + 10000u_{m,J}^2$$

6) For m=1, 2, . . . M, if $l_m \neq -100$, update the m-th NPI long term average performance recovery threshold $V_m$:

$$V_m = \max\left\{0, \frac{l_m - 3\sqrt{L_m}}{100}\right\}$$

7) For m=1, 2, . . . M, if $l_m \neq -100$, set the long term average performance recovery decision function value $$d3_m = \begin{cases} 0, & \text{if } u_{m,new} \geq V_m \quad \begin{pmatrix} \text{recovery of long term} \\ \text{average performance } m^{th} \text{ NPI} \end{pmatrix} \\ 1, & \text{if } u_{m,new} < V_m \quad \begin{pmatrix} \text{long term average performance} \\ \text{has not recovered yet } m^{th} \text{ NPI} \end{pmatrix} \end{cases}$$

8) Repeat step 1).

6. Performance Anomaly Clear Alarm Algorithm
Use the same ordering of the M NPI as the severe & abrupt NPI degradation/outage detection.

1) At the next NPI measurement time instant after finish executing all the three performance anomaly detection algorithm, for m=1, 2, . . . M, read $d1_m$, $d2_m$, $d3_m$ and $p_m$
2) If $d1_m=0$, $d2_m=0$, $d3_m=0$, and $p_m=1$, clear alarm for NPI performance anomaly of the m-th NPI and set $p_m=0$
3) Repeat 1).

As set forth above, a scheme for network performance anomaly detection has been disclosed based on 1) detecting severe and sudden change in the NPI OM 2) Detecting slow and persistent degradation of the NPI OM. Furthermore, utilizing multiple NPIs helps reduce the false alarm probability while maximizing the probability of outage detection. Each NPI has two network performance degradation thresholds which dynamically adapts to changes in the most recent mean and variance values of the NPI success rate in the severe and abrupt NPI degradation detection. The severe and abrupt performance degradation decision rule compares the most recent measurement of NPI call success rate against this dynamic threshold value in order to determine if there is a statistically significant large and sudden change from the most recent mean value. At any particular time instant at which the NPI call success rate dropped below the threshold, a network performance anomaly alarm is issued for that NPI.

The second dynamic threshold for network performance anomaly detection uses a low pass filter (i.e. long moving average window) to smooth out the normal NPIs daily fluctuation in order to discriminate real versus fictitious slow downward trend in the NPI OM performance. To ascertain that the network performance anomaly event has abated, three abatement dynamic thresholds are proposed. The first two thresholds concern the detection of the abatement event related to the severe and abrupt NPI degradation detection and the slow and persistent NPI detection algorithm. The last abatement dynamic threshold is used to check whether the net-work performance has recovered to its long term average performance level. Once a network performance anomaly alarm has been set, it could only be cleared when the relevant NPI OM value exceeds all three abatement thresholds.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of detecting performance anomaly events in a communication network comprising at least a network degradation detection processor, the method comprising:
reading current Network Performance Indicator (NPI) Operational Measurements (OMs) at a current time t into the degradation detection processor;
determining, using the degradation detection processor, a dynamic performance degradation threshold which changes based on a plurality of historical NPI OM values immediately preceding the current NPI OMs;
comparing, using the degradation detection processor, the current NPI OMs with the dynamic performance degradation threshold; and
generating an indication of an alarm condition if the comparison indicates the existence of a performance degradation condition.

2. The method of claim 1, wherein the dynamic performance degradation threshold comprises a severe and abrupt performance degradation threshold, and wherein the degradation detection processor repeatedly takes NPI OMs during NPI measurement periods, and wherein the severe and abrupt performance degradation threshold is determined using the average value and variance value of the NPI OMs read by the degradation detection processor during no more than the last ten NPI measurement periods immediately preceding the current NPI OM.

3. The method of claim 1, wherein the dynamic performance degradation threshold comprises a severe and abrupt performance degradation threshold, and wherein the degradation detection processor repeatedly takes NPI OMs during NPI measurement periods, and wherein the severe and abrupt performance degradation threshold is determined using the average value and variance value of the NPI OMs read by the degradation detection processor during no more than the last five NPI measurement periods immediately preceding the current NPI OM.

4. The method of claim 1, further comprising:
inputting a predetermined potential outage alarm threshold value into the degradation detection processor, said predetermined potential outage alarm threshold corresponding to the occurrence of a predetermined plurality of alarm condition indications being generated by said degradation detection processor within a same NPI measurement period;
monitoring the number of alarm condition indications generated by said degradation detection processor during a particular NPI measurement period;
comparing the number of alarm condition indications generated by said degradation detection processor during said particular NPI measurement period with said potential outage alarm threshold value; and
generating a potential outage alarm if the comparison of the number of alarm condition indications and said potential outage alarm threshold value indicates the existence of a potential outage condition.

5. A method of detecting performance anomaly events in a communication network comprising at least a network degradation detection processor, the method comprising:
reading current Network Performance Indicator (NPI) Operational Measurements (OMs) at a current time t into the degradation detection processor;
determining, using the degradation detection processor, a data trend line based on a moving average of NPI OMs for historical NPI OM values immediately preceding the current NPI OMs;
determining, using the degradation detection processor, the slope of the data trend line;
comparing, using the degradation detection processor, the slope of the data trend line with a predetermined slow and persistent degradation threshold; and
generating an indication of an alarm condition if the comparison indicates the existence of a long-term performance anomaly.

6. The method of claim 5, wherein the degradation detection processor repeatedly takes NPI OMs during NPI measurement periods and wherein the data trend line is determined using the moving average NPI OMs read by the degradation detection processor during more than, but including, the last ten NPI measurement periods immediately preceding the current NPI OM.

7. A computer readable medium containing computer instructions for detecting performance anomaly events in a communication network comprising at least a network degradation detection processor, the medium comprising computer executable instructions for:
reading current Network Performance Indicator (NPI) Operational Measurements (OMs) at a current time t into the degradation detection processor;
determining a dynamic performance degradation threshold which changes based on a plurality of historical NPI OM values immediately preceding the current NPI OMs;
comparing the current NPI OMs with the dynamic performance degradation threshold; and generating an indication of an alarm condition if the comparison indicates the existence of a performance degradation condition.

8. The computer readable product of claim 7, wherein the dynamic performance degradation threshold comprises a severe and abrupt performance degradation threshold, and wherein the degradation detection processor repeatedly takes NPI OMs during NPI measurement periods, and wherein the severe and abrupt performance degradation threshold is determined using the average value and variance value of the NPI OMs read by the degradation detection processor during no more than the last ten NPI measurement periods immediately preceding the current NPI OM.

9. The computer readable product of claim 7, wherein the dynamic performance degradation threshold comprises a severe and abrupt performance degradation threshold, and wherein the degradation detection processor repeatedly takes NPI OMs during NPI measurement periods, and wherein the severe and abrupt performance degradation threshold is determined using the average value and variance value of the NPI OMs read by the degradation detection processor during no more than the last five NPI measurement periods immediately preceding the current NPI OM.

10. The computer readable product of claim 7, further comprising:
- inputting a predetermined potential outage alarm threshold value into the degradation detection processor, said predetermined potential outage alarm threshold corresponding to the occurrence of a predetermined plurality of alarm condition indications being generated by said degradation detection processor within the same NPI measurement period;
- monitoring the number of alarm condition indications generated by said degradation detection processor during a particular NPI measurement period;
- comparing the number of alarm condition indications generated by said degradation detection processor during said particular NPI measurement period with said potential outage alarm threshold value; and
- generating a potential outage alarm if the comparison of the number of alarm condition indications and said potential outage alarm threshold value indicates the existence of a potential outage condition.

* * * * *